(12) United States Patent
Wooten et al.

(10) Patent No.: US 7,244,090 B2
(45) Date of Patent: Jul. 17, 2007

(54) STORAGE RACK FOR A VEHICLE

(75) Inventors: Donald W. Wooten, Dallas, TX (US);
Robert E. Reed, Jr., Dallas, TX (US);
Robert F. Fisher, Dallas, TX (US)

(73) Assignee: Tactical & Rescue Gear, Ltd., Plano, TX (US)

( * ) Notice: Subject to any disclaimer, the term of this patent is extended or adjusted under 35 U.S.C. 154(b) by 0 days.

(21) Appl. No.: 11/500,105

(22) Filed: Aug. 7, 2006

(65) Prior Publication Data
US 2006/0285953 A1 Dec. 21, 2006

Related U.S. Application Data

(63) Continuation of application No. 10/687,982, filed on Oct. 17, 2003, now abandoned.

(51) Int. Cl.
*B62D 43/02* (2006.01)
(52) U.S. Cl. .............. 414/466; 414/463; 414/465; 224/42.12; 224/42.21; 224/42.24; 224/42.26
(58) Field of Classification Search ............ 414/463, 414/464, 465, 466; 224/42.21, 42.12, 43.24, 224/42.26
See application file for complete search history.

(56) References Cited

U.S. PATENT DOCUMENTS

| | | | |
|---|---|---|---|
| 1,445,913 A | 2/1923 | Roos | |
| 1,505,927 A | 8/1924 | Bayne | |
| 1,506,833 A | 9/1924 | Higginbotham | |
| 1,808,042 A | 6/1931 | Kennedy | |
| 1,809,119 A | 6/1931 | Haffke | |
| 1,974,599 A | 9/1934 | Bradford | |
| 2,377,149 A | 5/1945 | Heil | |
| 2,433,169 A | 12/1947 | Stephenson et al. | |
| 2,819,004 A | 1/1958 | Kubik et al. | |

(Continued)

FOREIGN PATENT DOCUMENTS

FR  2586992 A1  3/1987

(Continued)

OTHER PUBLICATIONS http://www.predatormotorsports.com/index.asp?PageAction=VIEWPROD&ProdID=252.

(Continued)

*Primary Examiner*—Patrick Mackey
*Assistant Examiner*—Charles Greenhut
(74) *Attorney, Agent, or Firm*—Dunlap, Codding & Rogers, P.C.

(57) ABSTRACT

A storage rack connectable to a mounting structure of a vehicle for supporting a load, comprising a load supporting structure, a bracket assembly, and a lift assembly. The load supporting structure is adapted to support the load when the load is associated with the load supporting structure. The bracket assembly is connected to the load supporting structure, the bracket assembly being attachable to the mounting structure. The lift assembly is associated with the load supporting structure for facilitating lifting of the load to the load supporting structure whereby the load can be supported by the load supporting structure and thus the vehicle when the bracket assembly connects the load supporting structure to the mounting structure of the vehicle.

14 Claims, 5 Drawing Sheets

U.S. PATENT DOCUMENTS

| | | |
|---|---|---|
| 2,991,894 A | 7/1961 | Walker |
| 3,019,928 A | 2/1962 | Mullins |
| 3,371,832 A | 3/1968 | Sekino et al. |
| 3,387,754 A | 6/1968 | Sinkey et al. |
| 3,507,514 A | 4/1970 | Betz |
| 3,613,971 A | 10/1971 | Betz |
| 3,658,201 A | 4/1972 | Williams et al. |
| 4,073,395 A | 2/1978 | Clement |
| 4,161,267 A | 7/1979 | Morrison, Jr. |
| 4,241,858 A | 12/1980 | Lawroski |
| 4,249,683 A * | 2/1981 | Park ........................ 224/42.12 |
| 4,275,981 A | 6/1981 | Bruhn |
| 4,312,620 A | 1/1982 | Muschalek, Jr. |
| 4,410,117 A | 10/1983 | Crawford et al. |
| 4,485,945 A | 12/1984 | Ankeny |
| 4,709,840 A | 12/1987 | Allen |
| 4,767,038 A | 8/1988 | McVicar |
| 4,771,926 A | 9/1988 | Anderson et al. |
| 4,948,024 A | 8/1990 | Warner et al. |
| 5,186,371 A | 2/1993 | Jozefczak et al. |
| 5,333,766 A | 8/1994 | Fisher |
| 5,871,327 A | 2/1999 | McWha |
| 6,059,155 A | 5/2000 | Young |
| 6,379,101 B1 | 4/2002 | Breaux |
| 2002/0084298 A1* | 7/2002 | Essig ........................ 224/509 |
| 2004/0222261 A1 | 11/2004 | Wilson |
| 2005/0095103 A1 | 5/2005 | Wooten et al. |

FOREIGN PATENT DOCUMENTS

| | | |
|---|---|---|
| FR | 2700995 A1 | 8/1994 |
| JP | 02306887 A | 12/1990 |

OTHER PUBLICATIONS http://www.premierhummer.com/hummer_h2_spare_tire_carrier.html.

* cited by examiner

STORAGE RACK FOR A VEHICLE

CROSS-REFERENCE TO RELATED APPLICATIONS

The present application is a continuation of U.S. Ser. No. 10/687,982 filed Oct. 17, 2003 now abandoned. The entire disclosure is hereby expressly incorporated herein by reference.

STATEMENT REGARDING FEDERALLY SPONSORED RESEARCH AND DEVELOPMENT

Not applicable.

BACKGROUND OF THE INVENTION

Utility vehicles used by the military, such as High Mobility Multi-Purpose Wheeled Vehicles (HMMWV), also known as humvees, have long been used by the military to traverse jungles, deserts, mountains and other terrains. The tires on HMMWVs are known as "run-flat" tires which are capable of running for 30-40 miles after such tires have been punctured. For this reason, the HMMWV has not been provided with a spare tire in military use. However, in Iraq, HMMWVs are more susceptible to having flat tires while crossing the rough, uneven surfaces of these various terrains. On numerous missions, the HMMWV has, in the past, been forced to return to the base to change a tire.

Several configurations exist for the HMMWV. Most of the designs transport items and soldiers in the rear part of the HMMWV. The tailgate of the HMMWV can be lowered to a useful angle in order to easily access items stored in the rear. A storage rack has been designed by others for carrying a spare tire on the HMMWV. This storage rack connects to the tailgate, but prevents the lowering of the tailgate. This storage rack hinders the use of the tailgate and prevents easy accessibility to items stored in the rear part of the HMMWV. Military equipment is typically heavy and cumbersome. Equipment, such as tires for the HMMWV, should be able to be used by the range of male and female soldiers from the $5^{th}$ percentile to the $95^{th}$ percentile in size and strength. For example, a female soldier ranked in the $5^{th}$ percentile is able to lift approximately 44 pounds without potential injury. A tire suited for a HMMWV typically weighs approximately 165 pounds. Therefore, a female soldier ranking in the $5^{th}$ percentile would most likely be unable to lift a tire suited for a HMMWV in the event of a flat tire or emergency. Further, a storage unit suited for a HMMWV should be strong enough to support approximately 3-4 g's of weight of an approximately 165 pound tire unit. Therefore, the storage unit should be able to withstand up to a 900 pound shock.

Because of the treacherous, uncertain, lengthy missions in which military personnel are assigned, the lack of storage space design on a humvee, the need for use of the tailgate, and the need of such a vehicle to transport heavy items, such as tires, without military personnel being injured, a need exists for an apparatus capable of storing and transporting items such as spare tires, gasoline, water, personal equipment, ammunition and other items typically used by the military and capable of allowing soldiers in the bottom percentiles of size and strength to stow and deploy these heavy items onto and off of the vehicle. It is to such an apparatus that allows for the loading, transportation, storage and unloading of items, such as spare tires, which the present invention is directed.

BRIEF DESCRIPTION OF THE SEVERAL VIEWS OF THE DRAWING

FIG. 4 is a perspective view of the storage rack having a lift assembly positioned in an extended position to form a ramp for loading the load, which in this example is shown as a tire.

FIG. 5 is another perspective view of the storage rack, wherein the load has been moved a distance upwardly on the ramp formed by the lift assembly.

FIG. 6 is a perspective view of the storage rack, wherein the load has been positioned on the load supporting structure of the storage rack.

FIG. 7 is a perspective view illustrating the lift assembly associated with the load supporting structure being in a folded position, and a locking plate of a locking assembly of the storage rack maintaining the lift assembly in the folded position whereby the load is secured onto the storage rack.

DETAILED DESCRIPTION OF THE INVENTION

Figure 1:
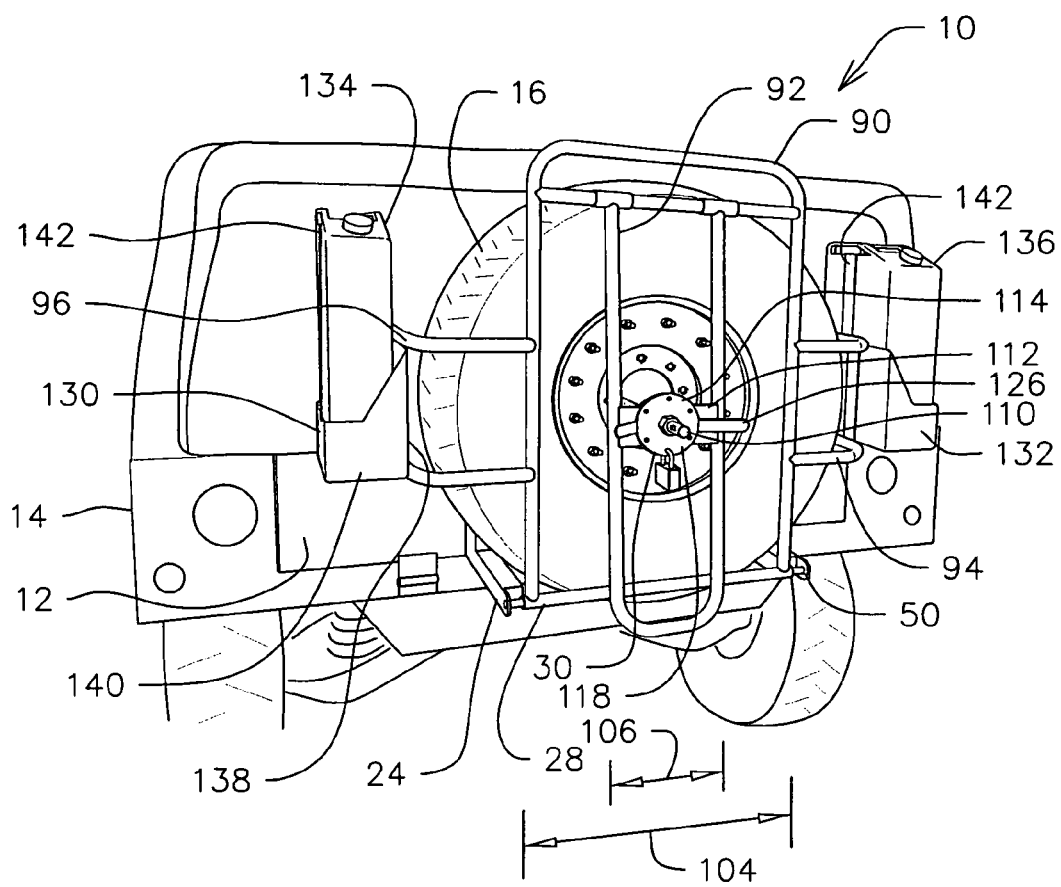
FIG. 1 is a perspective view of a storage rack constructed in accordance with the present invention, connected to a vehicle.

Referring now to the drawings, and in particular to FIG. 1, shown therein and designated by a reference numeral 10, is a storage rack constructed in accordance with the present invention. As will be described in more detail below, the storage rack 10 is connected to a mounting structure 12 of a vehicle 14 for supporting a load 16. In one preferred embodiment, the mounting structure 12 is a tailgate of the vehicle 14. However, it should be understood that the mounting structure 12 need not be the tailgate, but can be any portion of the vehicle 14 which is capable of receiving the storage rack 10 and supporting the storage rack 10 and the load 16 as discussed herein. For example, the mounting structure 12 may in certain circumstances be a portion of a top of the vehicle 14 or a swinging gate.

The vehicle 14 is typically a vehicle having the tailgate. In this instance, the vehicle 14 can be a truck, a military vehicle such as a humvee, a four wheeler, or a utility vehicle such as a golf cart having a truck bed. However, it should be understood that the vehicle 14 is not limited to a type of vehicle having a tailgate. For example, the vehicle 14 could be a snowmobile, a boat, a riding lawnmower, a motorhome, or a ship.

The load 16 is preferably a tire having an attached rim. However, it should be understood that the load 16 can be any type of load or cargo which can be supported by the storage rack 10 and the vehicle 14 for transport from one location to another. It should also be understood that the storage rack 10 is capable of forming a cage for transporting virtually any object capable of being retained within the cage. For example, the load 16 could be a variety of items such as a duffle bag, a tent, fuel, water, food, ammunition, personal equipment or any other kind of load that is capable of being transported in the storage rack 10.

In general, the storage rack 10 is provided with a load supporting structure 24, a bracket assembly 26 (FIG. 2), a lift assembly 28, and a locking assembly 30. The load supporting structure 24 is adapted to support the load 16 when the load 16 is associated with, e.g., placed on or in, or secured to, the load supporting structure 24. The bracket assembly 26 is connected to the load supporting structure 24. The bracket assembly 26 is attachable to the mounting structure 12 of the vehicle 14. In one preferred embodiment, the bracket assembly 26 is attachable to the tailgate of the vehicle 14 in a manner such that the tailgate does not have to be modified. That is, the bracket assembly 26 connects the load supporting structure 24 to the tailgate such that no holes need to be drilled in the tailgate, or other modifications made to the tailgate. The lift assembly 28 is associated with the load supporting structure 24 for facilitating lifting of the load 16 to the load supporting structure 24 whereby the load 16 can be supported by the load supporting structure 24 and thus the vehicle 14 when the bracket assembly 26 connects the load supporting structure 24 to the mounting structure 12, such as the tailgate, of the vehicle 14.

The load supporting structure 24 is provided with a platform 40. The platform 40 of the load supporting structure 24 receives at least a portion of the load 16 and functions to support the load 16. The platform 40 preferably engages at least a portion of the load 16 to support the load 16. However, it should be understood that the platform 40 does not necessarily have to engage the load 16. Spacers, or other structures can be positioned in between the platform 40 and the load 16. Preferably, the load 16 is secured to the platform 40 so that the load 16 will not inadvertently disengage or lose support from the vehicle 14.

In one preferred embodiment, the platform 40 is formed by a first bracket 42, and a second bracket 44. In this regard, the first bracket 42 and the second bracket 44 cooperate to form the platform 40. It should be understood that although the embodiment depicted in FIG. 2 only has the first and second brackets 42 and 44, the platform 40 could be formed by any number of brackets, such as one, three, five or the like.

The first bracket 42 and the second bracket 44 are similar in construction and function. For this reason, only the first bracket 42 will be described in detail hereinafter. The first bracket 42 is desirably an L-shaped bracket having a first leg 46, and a second leg 48.

The first leg 46 is connected to the second leg 48. In one preferred embodiment, the first leg 46 and the second leg 48 are formed separately and then connected together by any suitable mounting assembly, such as welding, tubular brackets, or the like. Alternatively, the first leg 46 and the second leg 48 can be formed integrally to form a unitary structure.

The first leg 46 is provided with a first end 50 and a second end 52. Similarly, the second leg 48 is provided with a first end 54 and a second end 56. The second end 52 of the first leg 46 is rigidly connected to the second end 56 of the second leg 48. The first leg 46 and the second leg 48 extend approximately 90° from each other although such angle could vary. As will be discussed in more detail below, the first end 50 of the first leg 46 is adapted to be connected to the lift assembly 28 of the storage rack 10.

It should be understood that although the first and second brackets 42 and 44 have been described herein as L-shaped brackets, it should be understood that such brackets could be provided in other shapes, sizes or configurations. For example, the first bracket 42 and/or the second bracket 44 could be a T-shaped bracket.

The first bracket 42 and the second bracket 44 are desirably constructed of very rigid materials so that such brackets 42 and 44 can cooperate to support the load 16 while the vehicle 14 is in motion. In one preferred embodiment, the first bracket 42 and the second bracket 44 are constructed of 2 inch outside diameter steel square tubing. However, it should be understood that the first bracket 42 and the second bracket 44 could be constructed of other types of rigid material, such as glass reinforced plastics, different sizes of square tubing, or different shapes or configurations of solid material or tubing.

Figure 2:
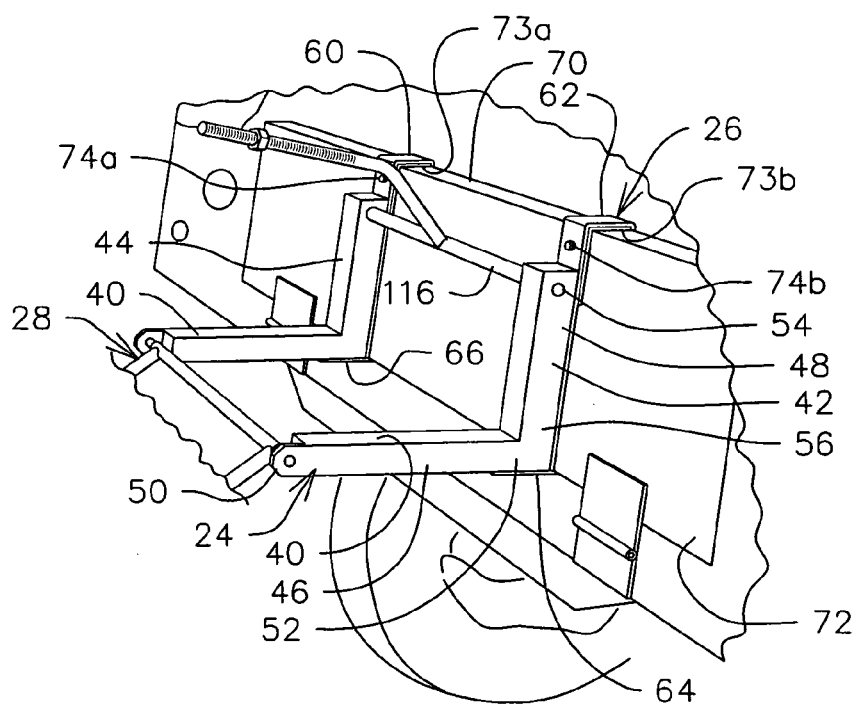
FIG. 2 is a perspective view of a load supporting structure constructed in accordance with the present invention and a bracket assembly connected to the load supporting structure for attaching the load supporting structure to the vehicle.

In one preferred embodiment, the first bracket 42 and the second bracket 44 are spaced a distance apart, as shown in FIG. 2. In this instance, a portion of the load 16 (depending upon the shape of the load 16) extends between the first bracket 42 and the second bracket 44. However, it should be understood that a structure (not shown) can be positioned between the first bracket 42, and the second bracket 44, if desired. The structure (not shown) can be used for reinforcing the first bracket 42, and the second bracket 44, or for another purpose such as providing more specialized support to the load.

Figure 9:
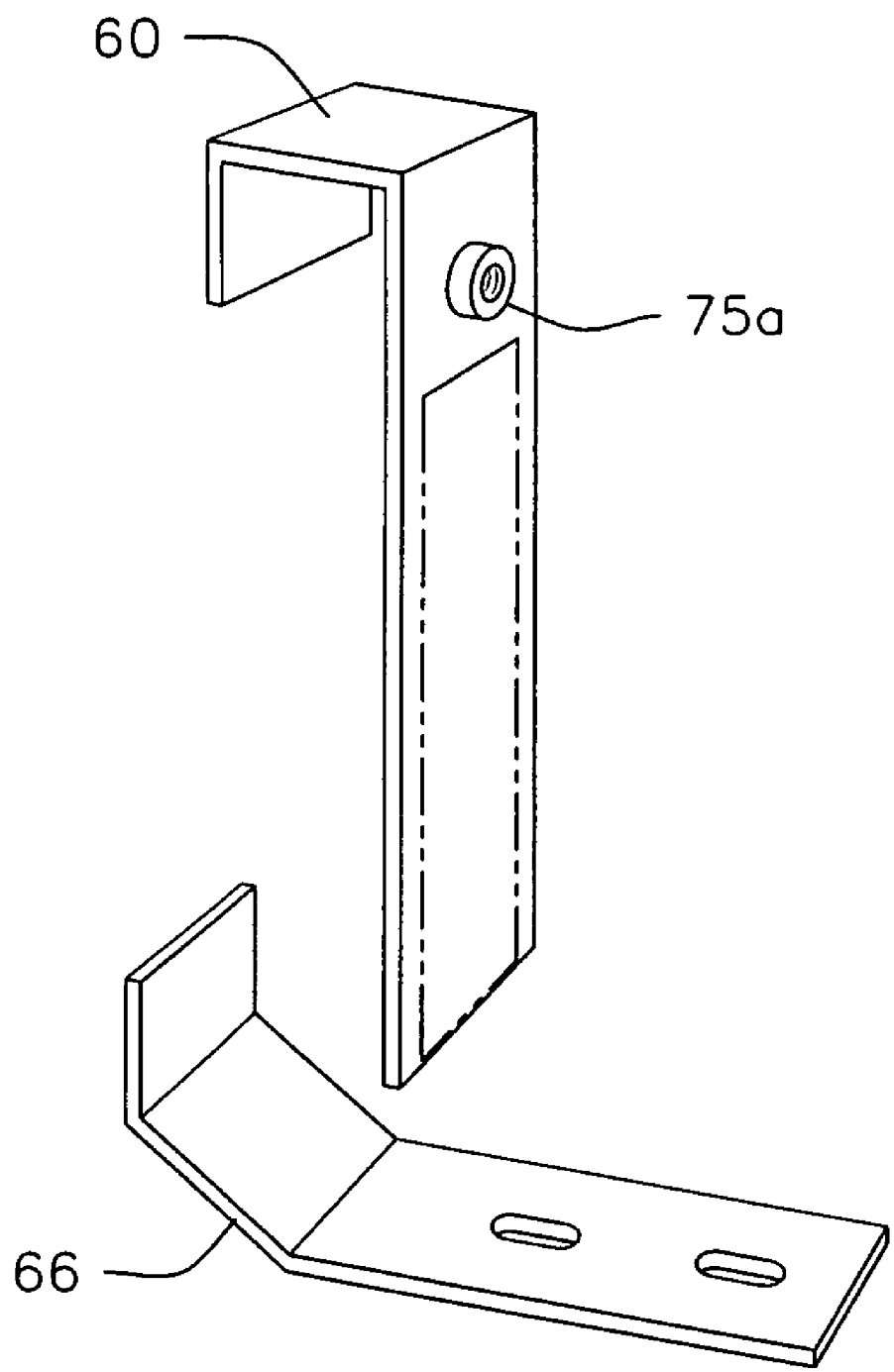

The bracket assembly 26 as depicted in FIG. 9 is provided with at least one flange 60 adapted to engage at least a portion of the mounting structure 12 for supporting the load supporting structure 24. In a preferred embodiment depicted in FIG. 2, the bracket assembly 26 is provided with four flanges, which are spatially disposed and designated in FIG. 2 by the reference numerals 60, 62, 64 and 66. Each of the flanges 60, 62, 64 and 66 are shaped so as to engage a portion of the mounting structure 12. It should be understood that although the embodiment depicted in FIG. 2 only has the flanges 60, 62, 64 and 66, the bracket assembly 26 could be formed with any number of flanges, such as one, three, five or the like.

In one preferred embodiment, each of the flanges 60 and 62 is provided with a U-shape so as to extend over and engage the mounting structure 12.

Figure 8:
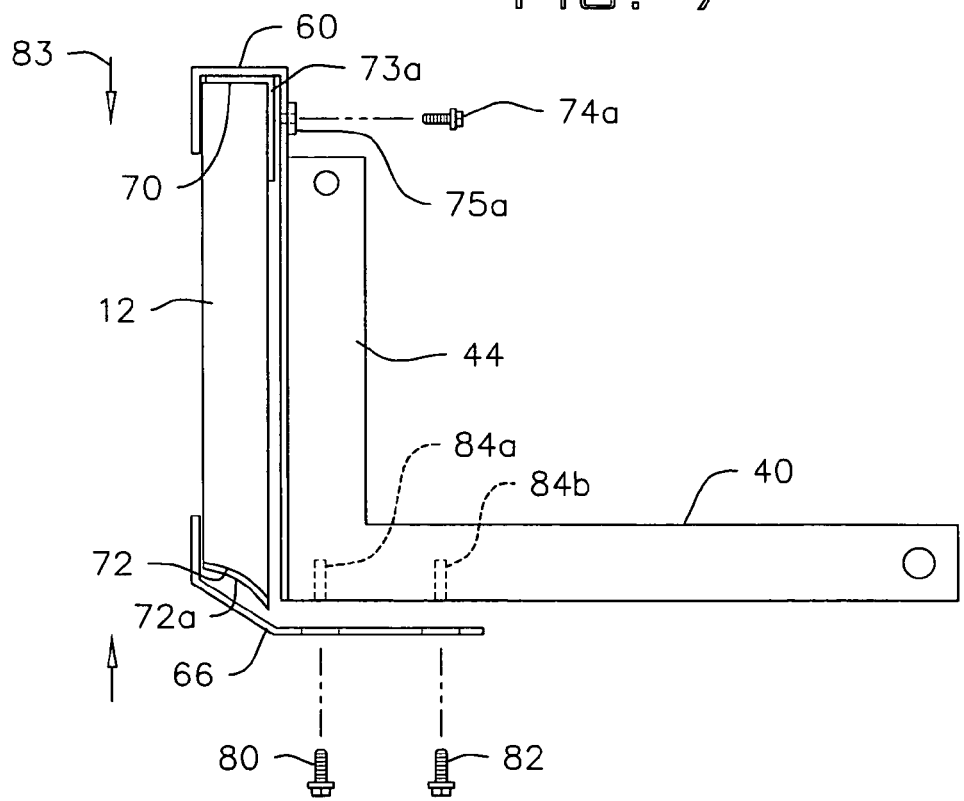

That is, in one preferred embodiment, the mounting structure 12 is provided with a first side 70, and an opposed second side 72. In the embodiment depicted in FIG. 2, the flanges 60 and 62 are shaped so as to extend over and encompass the first side 70 of the mounting structure 12. As shown in FIG. 8, the vehicle 14 is provided with a rubber gasket 72a positioned on the second side 72 of the mounting structure 12. The flange 66 compresses the rubber gasket 72a when the flange 66 is tightened to the first leg 46 of the first bracket 42. The compression of the rubber gasket 72a along with some slop in the hinges connecting the mounting structure 12, e.g. the tailgate to the vehicle 14 allows a substantial amount of weight associated with the storage rack 10 to be transferred from the mounting structure 12 to the vehicle 14 when the mounting structure 12 is in an upright, closed position and the storage rack 10 is connected to the vehicle 14. In this position, the flange 66 rests against the floor of the vehicle 14 which allows the weight of the storage rack 10 to be transferred from the mounting structure 12 to the vehicle 14.

Also shown in FIG. 8, positioned between each of the flanges 60 and 62 and the mounting structure 12 is a clamp member 73a and 73b (only the flange 60 and the clamp member 73a being shown in FIG. 8) which may be positioned so as to engage the mounting structure 12. In a preferred embodiment, the clamp members 73*a* and 73*b* have an L-shape.

As shown in FIG. 2, the flanges 60 and 62 are superimposed on top of the clamp members 73*a* and 73*b*. The clamp members 73*a* and 73*b* serve to engage the mounting structure 12 to help prevent inadvertent movement of the bracket assembly 26. A threaded opening 75*a* and 75*b* (the threaded opening 75*a* being shown in FIG. 8) is created in each of the flanges 60 and 62 so as to allow an adjustment member 74*a* and 74*b* to be passed through the threaded opening 75*a* and 75*b* so as engage the clamp members 73*a* and 73*b* to create a clamp effect 76 (shown by way of arrows in FIG. 8) in order to lock the bracket assembly 26 to the mounting structure 12 without any holes or modifications being made to the mounting structure 12. In a preferred embodiment, the adjustment members 74*a* and 74*b* may be bolts, however, any kind of device may be used that engages the clamp member 73 to create the clamp effect 76.

In a similar manner, the flanges 64 and 66 are each shaped so as to extend over and encompass at least a portion of the second side 72 of the mounting structure 12. In a preferred embodiment, the flanges 64 and 66 are substantially L-shaped brackets. The flanges 64 and 66 may be slipped from the inside of the mounting structure 12 to slide under the first leg 46 of the first bracket 42 and the first leg (not numbered) of the second bracket 44, respectively.

The bracket assembly 26 is also provided with a first adjustment assembly 76 (FIG. 8) and a second adjustment assembly (not shown). The first adjustment assembly 76 is associated with the flange 60, and/or the flange 66 so as to permit a user to control the relative distance between the flanges 60 and 66. In this regard, the combination of the flange 60, the flange 66 and the first adjustment assembly 76 cooperate to form a clamp for clamping the load supporting structure 24 to the mounting structure 12 of the vehicle 14. The flange 60, and/or the flange 66, and/or the first adjustment assembly 76 are connected to the second bracket 44 of the platform 40. In one preferred embodiment, the flange 60 is connected to the second leg of the second bracket 44. The flange 60 can be connected to the second leg 48 via any suitable manner, such as welding, or one or more bolts and nuts, or combinations thereof.

In a similar manner, the flange 62 cooperates with the flange 64, and the second adjustment assembly 78 to form a second clamp for clamping the first bracket 42 of the platform 40 of the load supporting structure 24 to the mounting structure 12 of the vehicle 14. The construction of the flange 62, the flange 64, and the second adjustment assembly 78 relative to the first bracket 42 is similar to the construction of the flange 60, flange 62, and first adjustment assembly 76 relative to the second bracket 44, which was described herein. For purposes of brevity, such description will not be repeated, but is specifically incorporated herein by reference.

The construction of the first adjustment assembly 76, and the second adjustment assembly are similar. Therefore, only the first adjustment assembly 76 will be described hereinafter with reference to FIG. 8. In a preferred embodiment depicted in FIG. 8, the first adjustment assembly 76 is provided with a first adjustment member 80, and preferably a second adjustment member 82 which are spatially disposed a distance apart from each other. Each of the adjustment members 80 and 82 serve to connect the flange 66 to the first leg of the second bracket 44 by passing each of the adjustment members 80 and 82 through threaded openings 84*a* and 84*b* respectively. The flange 66 is then fastened to the first leg of the first bracket 44 by tightening each of the adjustment members 80 and 82. By tightening each of the adjustment members 80 and 82, a force is created pulling down on the flange 60. This force creates a clamping effect 83 between the flanges 60 and 64 thereby locking the bracket assembly 26 to the mounting structure 12 without drilling holes into the vehicle 14 or making any other modifications to the vehicle 14.

It shall be understood that any number of adjustment members may be used in order to connect the flange 66 to the first leg of the second bracket 44. Further, the flange 66 may be connected to the first leg of the second bracket 44 via any suitable manner, such as a rachet or one or more bolts and nuts, or combinations thereof.

Figure 3:
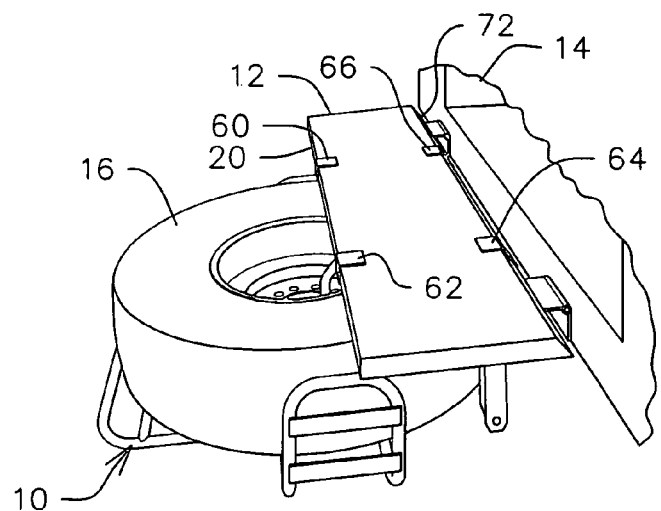
FIG. 3 is a perspective view of the storage rack wherein the storage rack is connected to a tailgate of the vehicle, and the tailgate is shown in a lowered position to illustrate portions of the bracket assembly extending about the tailgate.

Referring now to FIG. 3, shown therein is the storage rack 10 connected to the mounting structure 12, which in this case is the tailgate of the vehicle 14. As shown in FIG. 3, the tailgate of the vehicle 14 can be moved to a lowered, or extended position and then moved to a raised position as shown in FIG. 1 with the storage rack 10 secured thereto.

Figure 4:
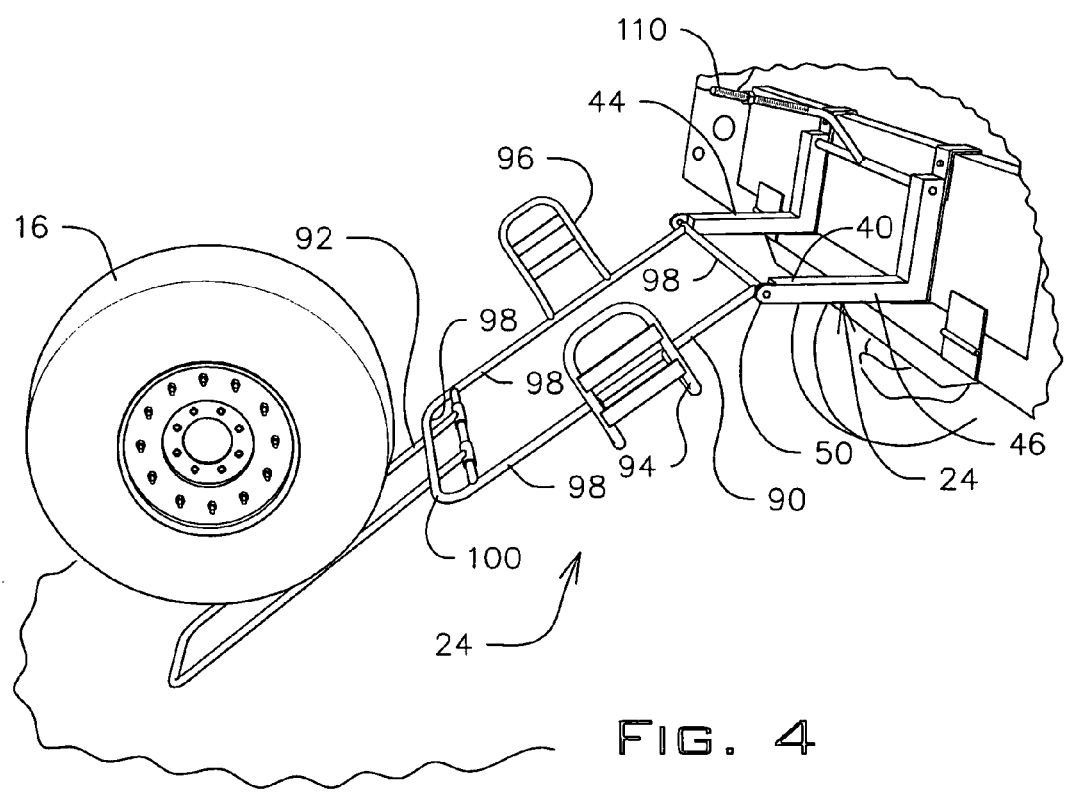
FIGS. 4-7 cooperate to illustrate one method of utilizing the storage rack for assisting in lifting a load onto the storage rack. Each of FIGS. 4-7 will be described separately hereinafter.

Referring now to FIG. 4 in combination with FIG. 1, the lift assembly 28 will now be described in more detail. In general, the lift assembly 28 is provided with a lift member 90, and a lever 92. The lift member 90 is pivotally connected to the platform 40 of the load supporting structure 24. However, it should be understood that the lift member 90 may alternatively be connected to the bracket assembly 26. In the embodiment depicted in FIG. 4, the lift member 90 is pivotally attached to the first end 50 of the first leg 46 of the first bracket 42 and the second bracket 44 of the platform 40. The connection between the lift member 90 and the platform 40 can be formed from any suitable assembly, such as by passing a smooth rod, or a threaded rod through a portion of the lift member 90. Alternatively, a ball bearing assembly, or other type of hinge could be used.

The lever 92 is movably connected to the lift member 90 so as to permit the lift assembly 28 to be folded to a folded position, as shown in FIG. 1, and then moved to an extended position as shown in FIG. 4. In one preferred embodiment, the lever 92 is attached to the lift member 90 via a pivotal connection, such as a hinge, bearing assembly, or other suitable type of pivotal or movable connection.

The lift assembly 28 is also provided with a pair of guides 94 and 96 connected to the lift member 90 to help guide the load onto the lift member 90, as will be described in more detail hereinafter. The guides 94 and 96 can be removable so that the storage rack may be shipped in a smaller container.

In one preferred embodiment, the lift member 90 is formed as a web structure from a plurality of connected rods 98. The rods 98 are, in general, arranged in a rectangular configuration and connected to each other at the ends thereof. However, it should be understood that the particular shape of the lift member 90 can vary. For example, the lift member 90 can have a circular shape, triangular shape, or any other symmetrical, asymmetrical, or fanciful shape. When the storage rack 10 is to be used in combination with the load 16 being a tire, the lift member 90 can be shaped so as to substantially correspond to the shape of the tire. In this regard, the guides 94 and 96 can be integrally formed with the lift member 90 (or formed separately and connected thereto) to help form the lift member 90 into the shape corresponding to the load 16, or the guides 94 and 96 can each correspond to portions of the shape of the load 16.

The lever 92 is connected to the lift member 90 near a distal end 100 of the lift member 90. The lever 92 extends past the distal end 100 of the lift member 90 when the lever 92 is in the extended position. Preferably, the lever 92, and the lift member 90 are arranged such that the lift member 90 engages the lever 92 in the extended position to prevent further pivotation of the lever 92 relative to the lift member 90.

The lift member 90 is provided with a width 104. The lever 92 is also provided with a width 106, which in a preferred embodiment is less than the width 104 of the lift member 90.

In general, the lever 92 is designed to form a ramp capable of facilitating upward, or vertical movement of the load 16. Although the lever 92 has been shown and described herein as a web structure formed of interconnected rods, or bars, it should be understood that the lever 92 could be formed of a solid structure, or two are more structures connected together to form a solid structure. For example, a mesh based substance could be installed on the lever 92 to facilitate the lever 92 functioning as a ramp.

Figure 5:
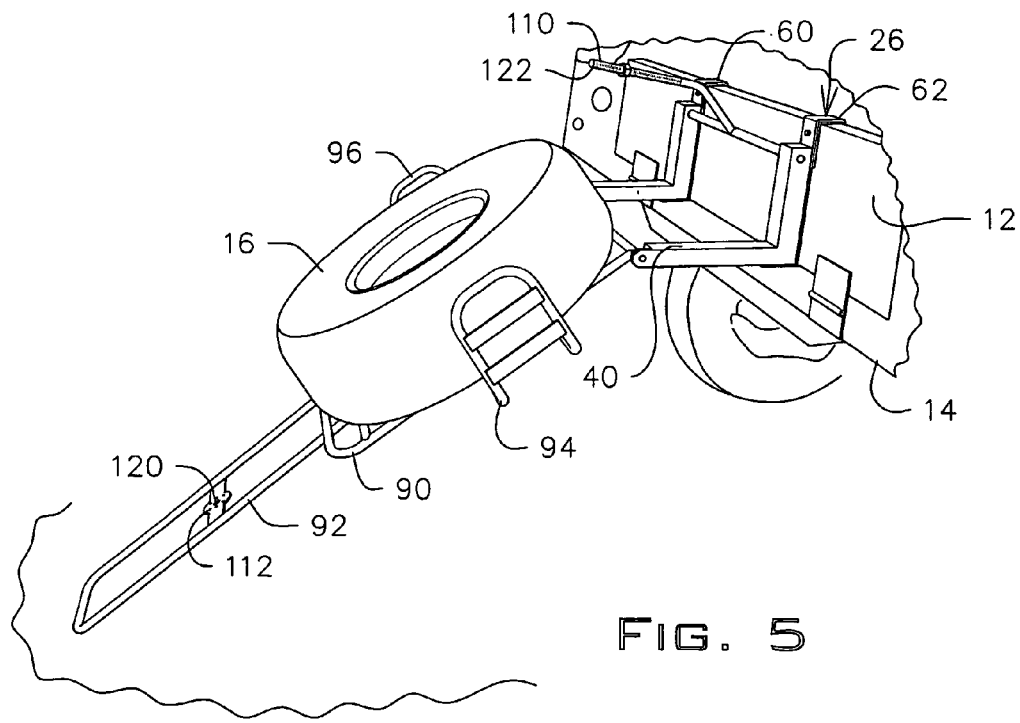
Figure 6:
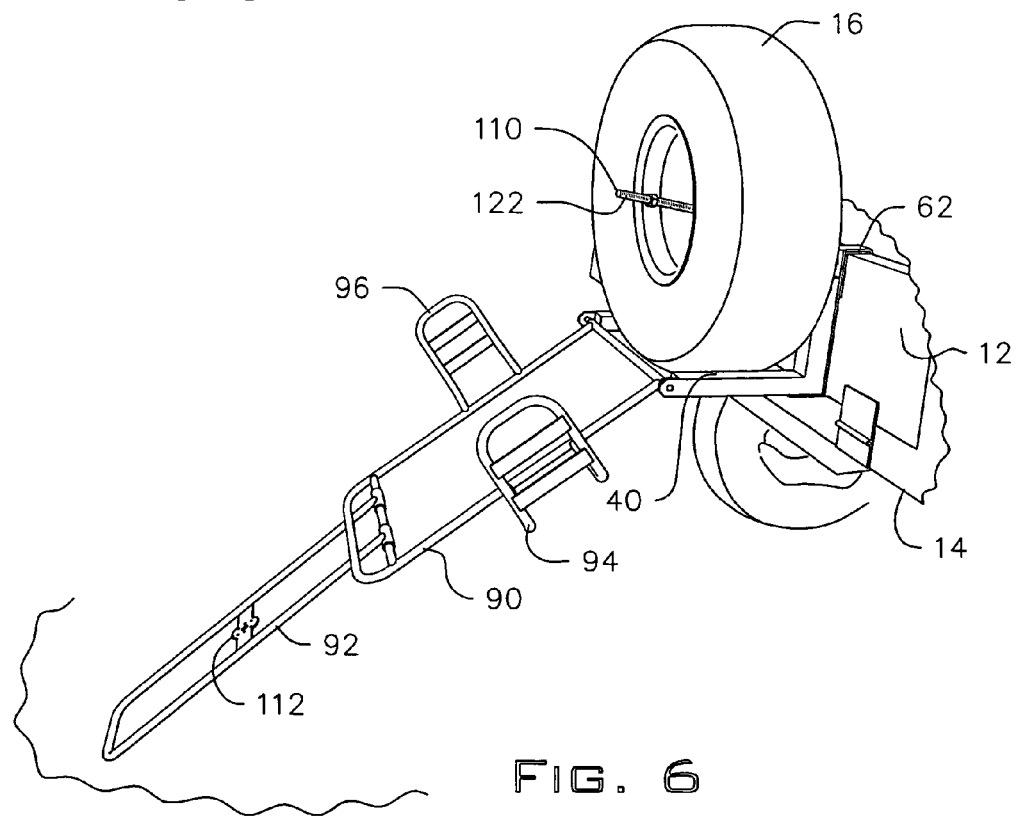
Figure 7:
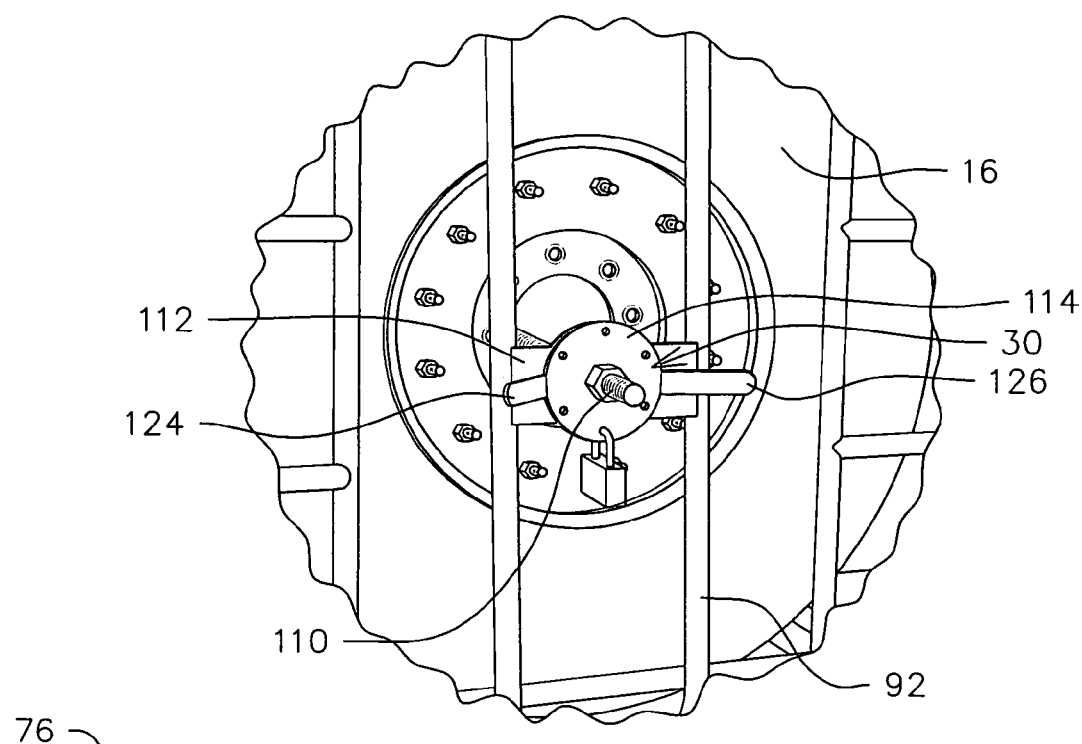

To load the load 16 onto the load supporting structure 24, the lift assembly 28 is moved to the extended position as depicted in FIG. 4. At least a portion of the load 16 is then positioned onto the lever 92, and then moved across the lever 92 up to the lift member 90 (as depicted in FIG. 5). For example, when the load 16 is the tire, the tire can be rolled up the lever 92 to the lift member 90. Once the load 16 is rolled up the lever 92, the load 16 may then be rotated approximately ninety degrees and positioned on the lift member 90 as shown in FIG. 5. In this position, the lever 92 is gripped by a user and then lifted to place the load 16 onto the platform 40 as shown in FIG. 6. Once the load 16 is in position on the platform 40, the lever 92 can then be moved to a folded position in order to secure the load 16, as shown in FIG. 1.

Similarly, to unload the load 16, the process discussed above is generally reversed.

To secure the load 16 into the storage rack 10, the storage rack 10 is provided with a locking assembly 30, which may also function as an antitheft device. The locking assembly 30 is provided with a locking member 110, a locking plate 112, and a stop member 114. The locking member 110 is supported by the load supporting structure 24, or the brackets assembly 26. Alternatively, the locking member 110 can be supported by the lift assembly 28. In one preferred embodiment, the locking member 110 is supported by the first and second brackets 42 and 44 of the platform 40. For example, the locking assembly 30 can be provided with a stabilizer bar 116 extending between the first bracket 42 and the second bracket 44. The stabilizer bar 116 can be connected to the first and second brackets 42 and 44 by any suitable method, such as welding, bolts, or the like. In the embodiment shown in FIG. 2, the locking member 110 is connected to the stabilizer bar 116 and extends therefrom so as to extend through at least a portion of the load 16 when the load 16 is positioned onto the load supporting structure 24. For example, when the load 16 is the tire and the rim, the locking member 110 is positioned to extend through at least a portion of the rim.

The locking plate 112 can be supported by the lever 92 of the lift assembly 28. In this regard, the locking plate 112 is provided with a hole 120 formed there through. The hole 120 of the locking plate 112 is generally aligned with the opening formed through the rim of the tire. The locking member 110 extends through the opening in the rim, and also extends through the hole 120 formed in the locking plate 112 such that a distal end 122 of the locking member 110 projects from the locking plate 112. The stop member 114 is positioned on the locking member 110 near the distal end 122 thereof for securing the load 16 on to the load supporting structure 24. In one embodiment, the distal end 122, and/or the portion of the locking member 110 near the distal end 122 is a threaded structure. In this example, the stop member 114 is also threaded so as to be able to be threaded onto the locking member 110. As an optional feature, the stop member 114 can be provided with a pair of handles 124 and 126 extending from a central portion 118 of the stop member 114. In this regard, the handles 124 and 126 facilitate the tightening of the stop member 114 onto the locking member 110.

Although the interconnection between the locking member 110 and the stop member 114 has been shown and described as threads, it should be understood that the locking member 110 and the stop member 114 can be secured to each other in any suitable fashion, such as a rachet, or the like. Further, it should be understood that the function of the locking assembly 30 is to maintain the load 16 on the load supporting structure 24. The locking assembly 30 can be constructed in any manner capable of maintaining the load 16 on the load supporting structure 24.

In another embodiment, the storage rack 10 may also have an optional holding assembly for securing for example, a gas can, water storage bottle, or any other type of suitable container. In a preferred embodiment as depicted in FIG. 1, the storage rack 10 is provided with holding assemblies 130 and 132 for receiving items such as containers 134 and 136 and providing excess storage for the vehicle 14. Each of the holding assemblies 130 and 132 are similar, therefore only the holding assembly 130 will be described in detail herein. The holding assembly 130 is provided with a flange 138 (not shown) and a platform 140. The platform 140 of the holding assembly 130 receives at least a portion of the container 134 and functions to support the container 134. The platform 140 preferably engages a portion of the container 134 in order to support the container 134. However, it should be understood that the platform 140 does not necessarily have to engage the container 134. Spacers, or other structures can be positioned in between the platform 140 and the container 134. It should also be understood that the holding assembly 130 may also be formed integrally with the guides 94 and 96 of the lift member 90 to form a unitary structure. In an alternative embodiment, the holding assembly 130 may be formed integrally with the lift member 90 of the storage rack 10.

The flange 138 may be connected to the storage rack 10 by connecting the flange 138 to the guide 90 as shown in FIG. 1. The flange 138 may be connected by any suitable method such as welding, or one or more nuts and bolts or combinations thereof.

Once the container 134 is positioned on the holding assembly 130, a securing device 142, such as a strap (shown in FIG. 1) can be used to secure the container 134 or any other device may be used which may be employed to secure the container 134 to the storage rack 10 so that the container 134 will not disengage while traveling.

In an alternative embodiment, the bracket assembly 24 can be designed to connect to a trailer hitch mount (not shown) connected to the vehicle 14. In this alternative, a trailer hitch extension extending under or past the load 16 can be provided in order to permit connection of a trailer and the storage rack to the trailer hitch mount.

The storage rack 10 of the present invention may also be sold as a kit which can be easily and rapidly mounted onto the vehicle 14, such as the HMMWV. As discussed above, modification of the HMMWV is typically unnecessary when the storage rack 10 is sold and assembled from the kit.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A storage rack connectable to a tail gate of a vehicle for supporting a tire, comprising:
   a load supporting structure adapted to support the tire when the tire is mounted on the load supporting structure;
   a bracket assembly connected to the load supporting structure, the bracket assembly being removably attached to the tail gate; and
   a lift assembly comprising:
      a lift member pivotally connected to the load supporting structure; and
      a lever pivotally connected to the lift member so as to permit the lift assembly to be folded to a folded position and moved to an extended position, the lever forming a ramp when the lever is positioned in the extended position whereby the tire can be rolled up the ramp formed by the lever and positioned on the lift member, wherein the lift member is rotated to the load supporting structure by lifting the lever so that the tire is transferred from the lift member to the load supporting structure.

2. The storage rack of claim 1 wherein the bracket assembly comprises a first flange having a distal end portion and a second flange having a distal end portion, the first flange connected to the load supporting structure, the first flange extending over and encompassing at least a portion of the tail gate, the second flange connected to the load supporting structure and extending over and encompassing at least of portion of the tail gate so that the tail gate is disposed between the distal end portion of the first flange and the distal end portion of the second flange.

3. The storage rack of claim 2 wherein the first flange of the bracket assembly is provided with a substantially U-shaped distal end portion and the second flange of the bracket assembly is provided with a substantially L-shaped distal end portion.

4. The storage rack of claim 2 wherein the first flange is provided with an aperture in the distal end portion thereof and wherein the bracket assembly further comprises:
   a clamp member positioned between at least a portion of the distal end portion of the first flange and the tail gate such that a portion of the clamp member is disposed in a covered position relative to the aperture in the first flange; and
   an adjustment member disposable through the aperture in the first flange for compressing engagement with the clamp member of the tail gate for securing the first flange of the bracket assembly to the tail gate.

5. The storage rack of claim 4 wherein the load supporting structure is provided with at least one threaded bore and wherein the bracket assembly is provided with at least one aperture therein, the aperture being alignable with the at least one threaded bore in the load supporting structure; and a threaded bolt positionable through the aperture so as to threadingly engage the threaded bore and thereby connect the second flange of the bracket assembly to the load supporting structure.

6. The storage rack of claim 1 wherein the load supporting structure includes a platform, and wherein the lift member is connected to the platform of the load supporting structure.

7. The storage rack of claim 1 wherein the lever is connected to the lift member near the distal end of the lift member.

8. The storage rack of claim 1 wherein the lift assembly further comprises:
   at least one guide, the at least one guide connected to the lift member for guiding the tire onto the lift member.

9. The storage rack of claim 8 wherein the at least one guide is integrally connected to the lift member.

10. The storage rack of claim 1 wherein in the folded position, the lift member is in a substantially parallel relationship with a sidewall of the tire when the tire is positioned on the load supporting structure.

11. The storage rack of claim 10 wherein the lift assembly has a locking plate with a hole alignable with an opening formed through the tire when the tire is positioned on the load supporting structure and the lift assembly is in the folded position, and wherein the storage rack further comprises:
   a locking member connected to the load supporting structure and extendable through the opening of the tire and the hole of the lift assembly; and
   a stop member connectable to the locking member to secure the lift assembly to the locking member thereby securing the tire to the load supporting structure.

12. The storage rack of claim 11 wherein the locking plate is connected to the lever.

13. The storage rack of claim 12 wherein the lever is pivotally connected to the lift member.

14. The storage rack of claim 1 wherein the load supporting structure is configured so as to permit the tailgate to be moved between an open position and a closed position.

* * * * *